May 9, 1967  E. B. CLARK  3,318,476
JUNCTION UNIT FOR UNDERFLOOR WIRE DISTRIBUTION SYSTEM
Original Filed Dec. 5, 1961  2 Sheets-Sheet 1
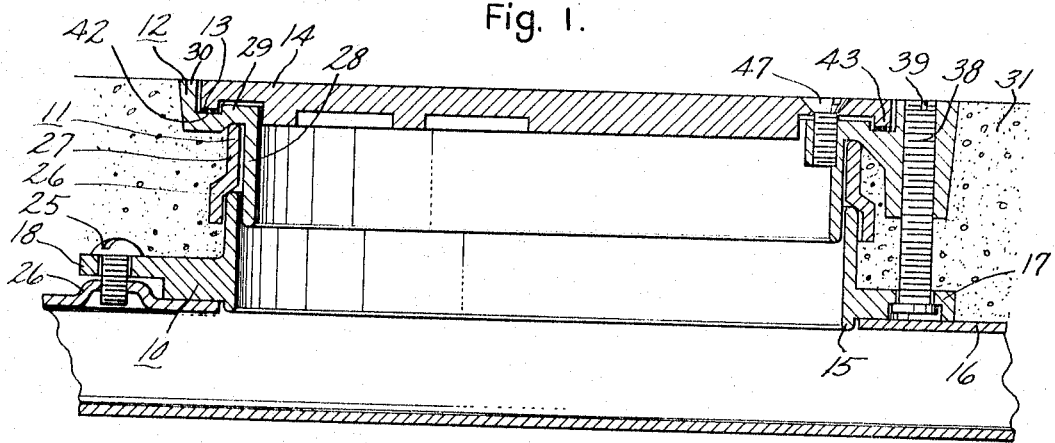
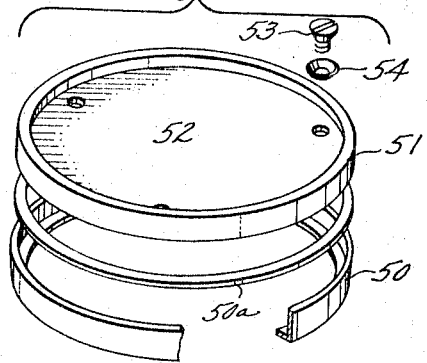
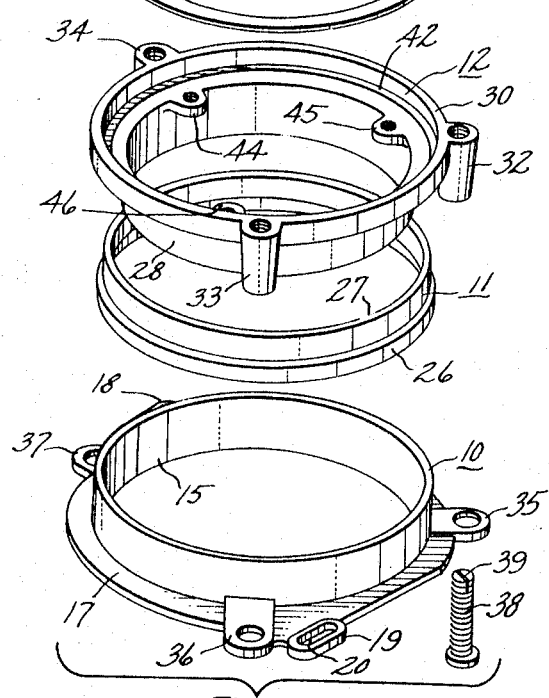
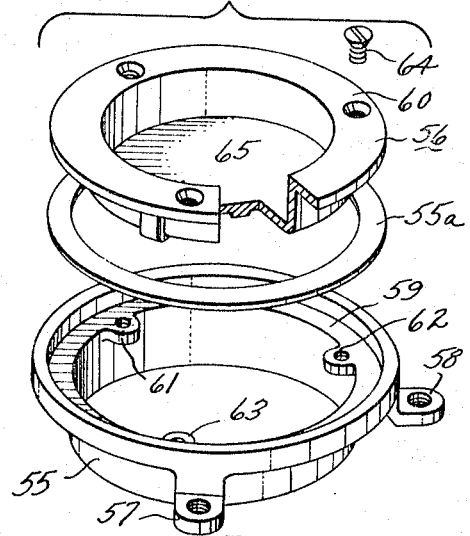
Inventor:
Edward B. Clark.
by Allard A. Braddock
His Attorney May 9, 1967 E. B. CLARK 3,318,476
JUNCTION UNIT FOR UNDERFLOOR WIRE DISTRIBUTION SYSTEM
Original Filed Dec. 5, 1961 2 Sheets-Sheet 2

INVENTOR.
EDWARD B. CLARK
BY
*J.R. Harris*
his ATTORNEY

3,318,476
JUNCTION UNIT FOR UNDERFLOOR WIRE DISTRIBUTION SYSTEM
Edward B. Clark, Milford, Conn., assignor to Jones & Laughlin Steel Corporation, Pittsburgh, Pa., a corporation of Pennsylvania
Continuation of application Ser. No. 157,225, Dec. 5, 1961. This application Jan. 26, 1965, Ser. No. 430,232
3 Claims. (Cl. 220—3.4)

This application is a continuation of my application Ser. No. 157,225 filed Dec. 5, 1961, now abandoned. This invention relates to duct junctions and more specifically to a junction unit to be secured to a wiring header duct in an underfloor wiring distribution system.

An underfloor wiring distribution system is frequently employed in large buildings having concrete or similar floor constructions where it is necessary to wire the floors to provide electrical connections. In such systems, a network of ducts is installed beneath the floor prior to installation of the floor to thereby form passages through which the electrical wiring may be installed. Multi-cellular metal flooring is particularly adapted to accommodate such distribution systems in that the parallel cells of the flooring may be used as wire passages. With cellular metal flooring, header ducts are commonly positioned on top of the cellular flooring in crossover relation to the cells so that wiring may be led from one cell to another. Cylindrical inserts are usually installed at intervals along the upper surface of such ducts to provide access openings through which the wires may be drawn and connected with floor outlets or other electrical connections.

It has been found that for a variety of reasons it is desirable that such junction units be laterally or horizontally adjustable as well as vertically adjustable. It is particularly desirable that the junction unit be positioned in a header duct so that the unit will be centrally located over the cell beneath the duct. Improper alignment may make installation of a bushing into the upper wall of the cell very difficult, if not impossible.

Since the floor material such as concrete or the like that is placed over the cellular metal flooring may be left uncovered or a variety of different types of floor surfaces may be installed over the concrete, it is desirable that the junction units employed be capable of easily receiving cover members suitable for use with the particular surface material employed.

Accordingly, it is a primary object of the invention to provide an improved junction unit to be secured to a wiring header duct of an underfloor wire distribution system.

It is a further object of the invention to provide a junction unit for an underfloor wire distribution system capable of being both laterally and vertically adjusted.

Another object of the invention is to provide a junction unit for an underfloor wire distribution system capable of receiving a variety of cover members.

Briefly stated, the invention relates to a junction unit to be secured to a wiring header duct of an underfloor wire distribution system. The junction unit includes a header ring having a cylindrical portion adapted to be positioned within an opening in a wiring header duct. The ring is provided with at least one outwardly extending lug engaging the upper surface of the duct adjacent a respective one of the sides of the opening in the duct. Each lug has a slot formed therein and fastening means of smaller area than the area of the slot are provided extending downwardly through an associated slot to secure the header ring to the duct.

The junction unit also includes a leveling ring having a lower cylindrical portion positioned within the header ring and having a flange extending outwardly from the upper end of the cylindrical portion and engaging the upper end of the header ring. The flange which is formed with an annular groove in its upper surface may be provided with a gasket adapted to fit within the groove. A plain cover having a depending annular ridge adapted to fit within the groove and abut the gasket may be optionally positioned on the flange. In the event the gasket and the plain cover are not utilized, a trim ring adapted to fit within the groove may be positioned therein, and a flush cover adapted to be received within the trim ring may be employed.

Further features, objects, and advantages will become apparent with reference to the following drawings in which:

FIGURE 1 is a cross-sectional view of the junction unit of the invention shown secured to the upper wall of an underfloor duct;

FIGURE 2 is an exploded perspective view of the junction unit of FIGURE 1;

FIGURE 3 is an exploded perspective view of a modified form of cover assembly that may be utilized with the basic members of the junction unit;

FIGURE 4 is an exploded perspective view of a modified form of a cover and leveling ring which may be utilized with the header ring of the invention.

Figure 5:
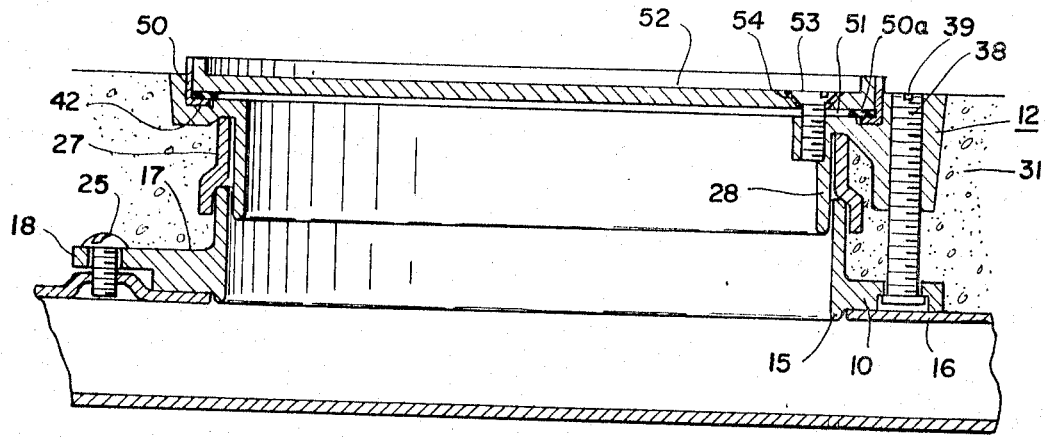
FIGURE 5 is a cross-sectional view of the junction unit of the invention embodying the cover assembly of FIGURE 3.
Figure 6:
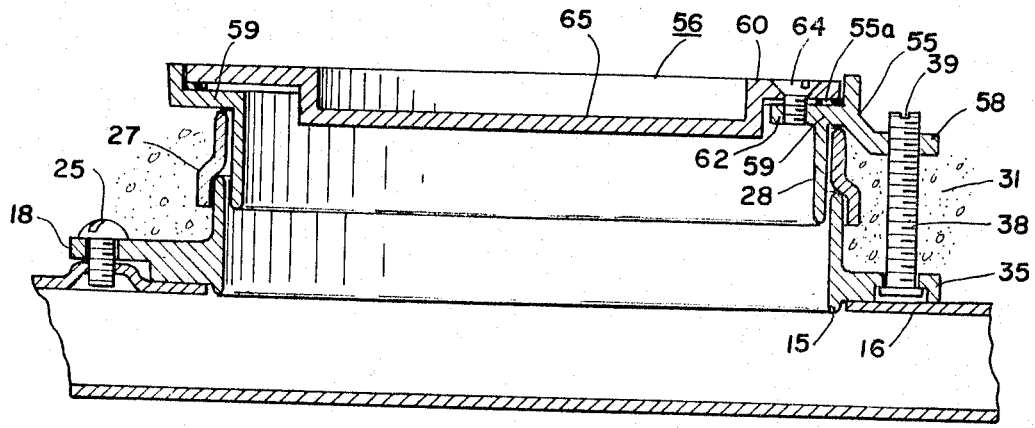
FIGURE 6 is a cross-sectional view of the junction unit of the invention embodying the cover and leveling ring of FIGURE 4.

Referring to FIGURES 1 and 2, one embodiment of the invention may be seen as comprising a header ring 10, an elevating ring 11, a leveling ring 12, a gasket 13, and a plain cover 14. The header ring 10 is provided with a downwardly extending cylindrical portion 15, FIGURE 1, positioned within an opening in the upper surface of duct 16. The duct 16 represents a cross-over or header duct which is to be supported by the cells of a multi-cellular metal floor (not shown). The header ring 10 is provided with an outwardly extending flange 17, adapted to engage the upper surface of the duct 16, and a pair of lugs 18 and 19 extending outwardly from the flange 17. Each of the lugs is provided with a slot formed therein as shown, for example, at 20 in lug 19, FIGURE 2. Suitable threaded fastening means such as a bolt or screw shown at 25 for lug 18 (FIGURE 1) are provided for each lug to secure the header ring 10 to the duct 16. The screws are preferably self-tapping to be threaded into openings in the upper surface of the duct 16; and to prevent the screw shanks from extending into the interior of the duct 16, the openings may be formed in bumps or raised portions such as that shown at 26.

The cross-sectional area of the screw 25 is smaller than the area of the slot 20 so that the header ring may be moved horizontally or laterally within the limits of the slot. In order to accommodate such movement, the opening in the duct 16 must be larger than the diameter of cylindrical portion 15 in the direction in which the ring 10 is to be moved. An elongated opening slightly smaller in size than flange 17 on ring 10 is sufficient to accommodate the movement allowed by the slots within the lugs 18 and 19. It should, of course, be recognized that the ring can be moved in any lateral direction desired if the opening in the upper walls of duct 16 is formed to accommodate the movement allowed by the slots or openings in the lugs. This provision for horizontal adjustment is particularly advantageous in centrally positioning the header ring 10 over the centerline of the floor cell positioned beneath the duct 16. The adjustment feature may, of course, be useful in other applications also.

The elevating ring 11 has a lower cylindrical portion 26 which fits over the upper end of header ring 10 and has an upper cylindrical portion 27 which is inwardly offset from the lower portion 26 so that it rests on the upper end of the header 10. As the name implies, the purpose of the elevating ring 11 is to give additional height to the junction unit and to permit the header ring 10 to be utilized with other junction elements as will be hereinafter described.

The leveling ring 12 has a lower cylindrical portion 28 positioned in the elevating ring 11 and a flange 29 extending outwardly from the upper end of the cylindrical portion 28 and engaging the upper end of the elevating ring 11. The leveling ring 12 is also provided with a cylindrical portion 30 which extends upwardly from the outer edge of the flange 29. It is usually desirable that the upper edge of the cylindrical portion 30 be flush with the surrounding floor as indicated at 31 in FIGURE 1. To obtain this result, the junction unit may be provided with vertical adjusting means. For this purpose, the leveling ring 12 is provided with lugs such as the three lugs 32, 33, 34 spaced around the outer periphery of ring 12, and each is provided with a threaded opening therein extending in a downwardly direction. In assembling the junction units, these openings are aligned with the respective openings in corresponding lugs 35, 36, 37, which extend outwardly from the flange 17 on the header ring 10. Leveling screws, one of which is shown at 38, extend upwardly through the openings in lugs 35–37 and are threaded into the openings in lugs 32–34. The upper end of each of the screws is formed with a slot, as shown at 39 for screw 38 so that the screws may be rotated by means of a screwdriver from above the junction unit. In this manner, the leveling ring may be adjusted to the desired level.

In accordance with one aspect of the invention, the flange 29 is formed with an annular groove 42 in its upper surface. The gasket 13 is adapted to be positioned within the groove, and the cover 14 is adapted to be received within the ring 12 so that its annular ridge 43 abuts against the gasket 13 to seal the opening into the duct 16. The cover 14 may be secured in this position by suitable fastening means. For this purpose, the leveling ring 12 is provided with three inwardly extending lugs 44, 45, and 46, and the cover 14 is provided with mating openings through which screws may be installed, one of which is shown at 47. The cover 14 is formed to be flush with the upper edge of the leveling ring when in the secured position. Such cover may be provided with an upper surface suitable for use with the floor 31, which is perhaps made of concrete or other material.

In the event it is desirable to place linoleum, tile, or similar material over the floor 31, the plain cover 14 and gasket 13 may, in accordance with the invention, be replaced by a trim ring 50, smaller gasket 50a, and flush cover 51, shown in FIGURE 3. The lower portion of the trim ring 50 is adapted to be positioned within the groove 42 in leveling ring 12, and the upper portion of the trim ring 50 may extend slightly above the upper edge of the leveling ring 12. More specifically, it may be desirable to have this ring 50 extend above the upper edge an amount equal to the thickness of the material to be placed over the floor 31 so that the top of ring 50 is flush with the material. The gasket 50a lies inside the trim ring and over the joint between trim ring and leveling ring. The flush cover 51 fits over the gasket 50a within the trim ring 50 so that its upper edge is level with the upper edge of the trim ring; and the center portion 52 of flush cover 51 may be recessed a sufficient amount to accommodate a section of the tile or linoleum to be placed over the floor 31. The cover 51 is provided with openings to mate with the openings in lugs 44, 45, and 46 so that suitable screws, one of which is shown at 53, may be inserted therein to secure the cover to the leveling ring 12. When the cover is secured, a seal is made between trim ring, cover, and leveling ring. To protect the flooring material, each of the openings in cover 51 may be provided with a suitable grommet, such as that shown at 54, in conjunction with screw 53. Thus, it can be seen that the groove feature of the leveling ring 12 uniquely adapts the ring to receive either a plain cover 14 or the flush cover 51.

Referring now to FIGURE 4, therein is shown a modified form of leveling ring 55 adapted to receive still another type of cover 56. The leveling ring 55 is adapted to be positioned directly on the header ring 10 and is provided with lugs to mate with lugs 35, 36, and 37, two of which are shown at 57 and 58. These lugs are adapted to receive leveling screws similar to that shown at 38 to provide vertical adjustability to the junction unit. The leveling ring 55 has an inwardly extending flange 59 upon which is received a gasket 55a and an outwardly extending flange 60 on cover 56. The leveling ring 55 is also provided with three inwardly extending lugs 61, 62, and 63, each having threaded openings therein which mate with suitable openings in cover flange 60. Suitable screws, one of which is shown at 64, are provided to secure the cover 56 and gasket 55a to the leveling ring 55. The cover 56 is formed with a depending central portion 65, the purpose of which is to receive the flooring material placed around the junction unit such as indicated at 31. The cover may also be used with other floor materials such as terrazzo tile. The upper surface of the flange 60 and the upper edge of the leveling ring 55 are normally intended to be level with the surrounding flooring.

It will be obvious to those skilled in the art that various changes and modifications may be made without departing from the invention in its broader aspects. For example, the lugs formed on the header ring may have any shape of slot or opening desired so that the header ring may be adjusted in any direction within the plane of the surface of the duct 16. Also, the header ring and the leveling rings may have the number of lugs and associated screws or bolts desired. Furthermore, different types of covers may be devised other than those described in the preceding paragraphs, and used in conjunction with the header ring and leveling ring of the invention. Accordingly, it is intended in the appended claims to cover all such changes and modifications as fall within the true spirit and scope of the invention.

I claim:

1. A junction unit adapted for use with a wiring header duct in an underfloor wire distribution system comprising a header ring, means for fastening the header ring to a wiring header duct, a leveling ring having a lower cylindrical portion adapted to fit inside the header ring and at its upper end an outwardly extending flange, an annular groove in that flange, means for adjustably positioning the leveling ring above the header ring, and connecting it therewith a trim ring having an upright rim and an inwardly extending flange positioned in the annular groove and of a thickness equal to the depth of the groove, and a cover fitting within the trim ring.

2. A junction unit as in claim 1 including an annular gasket between the trim ring and the cover, the gasket extending over the junction between the trim ring flange and the leveling ring flange.

3. A junction unit for use with a wiring header duct in an underfloor wire distribution system comprising: a header ring, means for fastening the header ring to a wiring header duct, an elevating ring having a lower portion which fits over the upper end of the header ring and having an upper cylindrical portion resting on the upper end of the header ring, a leveling ring having a lower cylindrical portion positioned within the elevating ring and having a flange extending outwardly from the upper end of the cylindrical portion over the upper end of the elevating ring, means connecting the leveling ring and the header ring for adjustably positioning the leveling ring above the elevating ring, and a cover fitting against the flange.

References Cited by the Examiner

UNITED STATES PATENTS

| | | | |
|---|---|---|---|
| 340,433 | 4/1886 | Dorsett | 52—221 |
| 1,626,570 | 4/1927 | Walker | 50—127 |
| 1,928,198 | 9/1933 | Buchanan | 220—3.4 |
| 2,930,504 | 3/1960 | Hudson. | |
| 2,931,533 | 4/1960 | Wiesmann | 50—127 |
| 2,950,837 | 8/1960 | Christensen et al. | 220—3.7 |
| 3,064,850 | 11/1962 | Kelly | 220—3.7 |
| 3,081,896 | 4/1963 | Hoskins | 220—3.7 X |

FOREIGN PATENTS

| | | |
|---|---|---|
| 1,800 | 1909 | Great Britain. |
| 321,184 | 11/1929 | Great Britain. |

LEWIS H. MYERS, *Primary Examiner.*

J. F. BURNS, *Examiner.*

H. W. COLLINS, W. B. FREDERICKS,
*Assistant Examiners.*